US00RE41811E

(19) United States
(12) Reissued Patent
Gutman et al.

(10) Patent Number: US RE41,811 E
(45) Date of Reissued Patent: Oct. 5, 2010

(54) INTEGRATION OF AUTHENTICATION AUTHORIZATION AND ACCOUNTING SERVICE AND PROXY SERVICE

(75) Inventors: Andrew Mark Gutman, Foothill Ranch, CA (US); Aravind Sitaraman, Santa Clara, CA (US); Sampath Kumar Sthothra Bhasham, Santa Clara, CA (US); Kalpathi S. Suryanarayanan, Cupertino, CA (US)

(73) Assignee: Cisco Technology, Inc., San Jose, CA (US)

(21) Appl. No.: 10/679,203

(22) Filed: Oct. 2, 2003

Related U.S. Patent Documents

Reissue of:
(64) Patent No.: 6,298,383
Issued: Oct. 2, 2001
Appl. No.: 09/225,247
Filed: Jan. 4, 1999

(51) Int. Cl.
*G06F 13/00* (2006.01)

(52) U.S. Cl. ..... 709/229
(58) Field of Classification Search ..... 709/200, 709/202, 203, 223, 224, 227, 229
See application file for complete search history.

(56) References Cited

U.S. PATENT DOCUMENTS

| | | | | |
|---|---|---|---|---|
| 4,763,191 | A | 8/1988 | Gordon et al. | 358/86 |
| 4,922,486 | A | 5/1990 | Lidinsky et al. | 370/60 |
| 4,962,497 | A | 10/1990 | Ferenc et al. | 370/60.1 |

(Continued)

FOREIGN PATENT DOCUMENTS

| | | |
|---|---|---|
| EP | 0567217 | 10/1993 |
| EP | 0 567 217 | 10/1993 |
| WO | 99/53408 | 10/1999 |

OTHER PUBLICATIONS

Steven M Bellovin, "Problem Areas for the IP Security Protocols", Proceedings of the Sixth Usenix UNIX Security Symposium, Jul. 22–25, 1996, San Jose, CA.
Active Software, Inc., "Active Software's Integration Systems", printed from http://www.activesw.com/products/products.html, on Jul. 24, 1998, pp. 1–6.
Ascend Communications, Inc., "Access Control Product Information", 4 pages, 1997.
Ascend Communications, Inc., "Remote Access Network Security", printed from http://www.ascend.com/1103.html, on Jul. 24, 1998, pp. 1–8.

(Continued)

*Primary Examiner*—Robert B Harrell
(74) *Attorney, Agent, or Firm*—BainwoodHuang

(57) ABSTRACT

A single database maintained centrally hosts both proxy service data and authentication, authorization and accounting (AAA) data. Data is then copied to storage used locally by each system when both systems are instantiated. Therefore the ISP/Telco need not maintain two different data bases. A protocol gateway (PGW) is used to determine if the incoming user is a wholesale or retail user. The PGW filters the domain portion of the access request to locate a remote AAA service. If one such service is found, the PGW routes the communication via the proxy service to proxy it to the remote AAA service. The returned packet from the remote AAA service is then searched for an IP address to be assigned to the incoming user. If one is not found the PGW obtains a dynamically allocated IP address from a DHCP server (using an IP-Pool-ID if supplied in the returned packet from the remote AAA service). The same mechanism is used to forward accounting event packets from the NAS to the remote AAA server. The PGW may monitor more than one proxy and/or AAA service and load balance among them.

69 Claims, 9 Drawing Sheets

U.S. PATENT DOCUMENTS

| | | | | |
|---|---|---|---|---|
| 5,003,595 | A | 3/1991 | Collins et al. | 380/25 |
| 5,241,594 | A | 8/1993 | Kung | |
| 5,241,599 | A | 8/1993 | Bellovin et al. | |
| 5,351,136 | A | 9/1994 | Wu et al. | |
| 5,416,842 | A | 5/1995 | Aziz | |
| 5,423,002 | A | 6/1995 | Hart | |
| 5,440,635 | A | 8/1995 | Bellovin et al. | |
| 5,560,005 | A | 9/1996 | Hoover et al. | |
| 5,621,721 | A | 4/1997 | Vatuone | |
| 5,655,077 | A | 8/1997 | Jones et al. | |
| 5,668,857 | A | 9/1997 | McHale | |
| 5,671,354 | A | 9/1997 | Ito et al. | |
| 5,684,950 | A | 11/1997 | Dare et al. | |
| 5,717,604 | A | 2/1998 | Wiggins | |
| 5,745,556 | A | 4/1998 | Ronen | |
| 5,768,521 | A | 6/1998 | Dedrick | |
| 5,778,182 | A | 7/1998 | Cathey et al. | |
| 5,809,422 | A | 9/1998 | Raleigh et al. | |
| 5,815,665 | A | 9/1998 | Teper et al. | |
| 5,835,727 | A | 11/1998 | Wong et al. | |
| 5,838,683 | A | 11/1998 | Corley et al. | |
| 5,845,070 | A | 12/1998 | Ikudome | |
| 5,898,780 | A | 4/1999 | Liu et al. | |
| 5,905,736 | A | 5/1999 | Ronen et al. | |
| 5,933,625 | A | 8/1999 | Sugiyama | |
| 5,944,824 | A | 8/1999 | He | |
| 5,960,409 | A | 9/1999 | Wexler | |
| 5,970,477 | A | 10/1999 | Roden | |
| 5,991,810 | A | 11/1999 | Shapiro et al. | |
| 6,011,910 | A | 1/2000 | Chau et al. | |
| 6,018,619 | A | 1/2000 | Allard et al. | |
| 6,021,496 | A | 2/2000 | Dutcher et al. | |
| 6,026,440 | A | 2/2000 | Shrader et al. | |
| 6,035,281 | A | 3/2000 | Crosskey et al. | |
| 6,047,376 | A | 4/2000 | Hosoe | |
| 6,052,730 | A | 4/2000 | Felciano et al. | |
| 6,092,196 | A | 7/2000 | Reiche | |
| 6,119,160 | A | 9/2000 | Zhang et al. | |
| 6,141,687 | A | 10/2000 | Blair | |
| 6,263,369 | B1 * | 7/2001 | Sitaraman et al. | 709/225 |

OTHER PUBLICATIONS

Ascend Communications, Inc., "Multi VPN from Ascend Communications: Breaking Down the Barriers to VPNs", White Paper, 1998.

Dr. Rafael Bracho, "Integrating the Corporate Computing Environment with Active Software", Nov. 18, 1998, pp. 1–17.

Dr. Rafael Bracho, "Mastering Corporate Computing with the ActiveWeb™ System", Aug. 2, 1996.

Active Software, Inc., "Active Software's Integration Systems", printed from http://www.activesw.com/products/products.html, on Jul. 24, 1998.

Ascend Communications, Inc., "Access Control Product Information", 4 pages, undated.

Ascend Communications, Inc., "MultiVPN from Ascend Communications: Breaking Down the Barriers to VPNs," White Paper, 1998.

Bellovin, Steven M., "Problem Areas for the IP Security Protocols", Jul. 22–25, 1996, Proceedings of teh Sixth Usenix UNIX Security Symposium, San Jose, CA.

Bracho, Dr. Rafael, "Integrating the Corporate Computing Environment with Active Software," Nov. 18, 1998, Active Software, pp. 1–17.

Bracho, Dr. Rafael, "Mastering Corporate Computing with the ActiveWeb System," 1996, Active Software, Inc.

IBM, "IBM Introduces new Subscriber Management System for Internet Service Providers," Dec. 2, 1998, IBM News, p. 1.

Rigney et al., "Remote Authentication Dial in User Service (RADIUS)," Network Working Group, RFC 2138, Apr. 1997, pp. 1–57.

* cited by examiner

| Domain | AAA IP | Port# | Shared Secret |
|---|---|---|---|

Domain = Domain of the user (corps.com)
AAA IP = IP Address of the domain's AAA. Corp A's AAA server
Port# = Port on which the domain's AAA is listening to RADIUS requests
Shared Secret = The shared secret that is to be used to hash the packets being sent to the domain's AAA

INTEGRATION OF AUTHENTICATION AUTHORIZATION AND ACCOUNTING SERVICE AND PROXY SERVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the field of data communications networks. More particularly, this invention relates to a method and apparatus for unifying the operation of authentication, authorization and accounting services and proxy services in a data communications network.

2. The Background

ISPs (Internet Service Providers) and Telcos (telephone companies) typically offer wholesale internet access and retail internet access to their subscribers. Wholesale access is typically offered to subsidiary and specialized service providers, CLECs (Competitive Local Exchange Carriers), corporations, and Community of Interest (COI) providers. Naturally, the processing afforded customers of the wholesale variety differs from the processing afforded customers of the retail variety. Subscriber information for individual wholesale users is usually stored by those who lease data communications network access from the ISP or Telco. Hence, corporations, CLECs and COI providers do not normally share their user information with the wholesale providers. The ISP or Telco, however, typically also has its own retail subscribers whose user information is stored in its databases. Hence, the ISP or Telco must identify an incoming user as a wholesale user or a retail user and initiate different actions for an incoming user based upon this status.

See, for example, FIG. 1 where a pure retail environment has a number of network access servers ($NAS_1$, $NAS_2$ and $NAS_3$) which provide data communications portals to the ISP's point of presence (PoP) on the data communications network. Each NAS is in communication with a conventional AAA (authentication, authorization and accounting) service maintained by the ISP. Incoming users connect to the NASes by dialing in over the telephone network or in another conventional manner.

Traditional wholesale ISPs and Roaming Service Providers offer network access through a technique called "Authentication proxying." Proxying involves the transfer of the Authentication responsibility to the "owner" of the subscriber. Thus, if a corporation was to outsource its corporate intranet to an ISP, what it gives up is the maintenance of its dial-up servers (i.e., the NASes). It does not, however, normally want to give up the control or information of its employees. Hence, when a corporate user dials in to such an ISP's network access servers, the user essentially perceives that the user is dialing into a corporate facility when the user is actually dialing into the ISP's domain and then somehow gaining admittance to the corporation's intranet.

What really happens in that scenario is that the ISP determines that the user belongs to Corporation A($Corp_A$) by parsing either the fully qualified domain name (FQDN) supplied by the user, a DNIS ID, or some other mechanism. Having determined that the user trying to gain access belongs to $Corp_A$, the ISP cannot really authenticate the user. As noted earlier, the user's record is still with the corporation. Hence, the ISP will "proxy" out the authentication transaction to the corporation. An AAA service within the corporation then identifies the user, verifies the password, and provisions the user. Then the AAA service notifies the ISP's proxy server that the user is acceptable and passes along provisioning details associated with the user (such as an IP address to use or a pool identification of an IP address pool from which an IP address needs to be allocated). The ISP then grants the user access to the network based upon the reply it gets back from the corporation. This technique is called "proxying." This is shown in FIG. 2.

To be able to do this, the ISP maintains minimal information on its proxy server 14 at its PoP. Information such as supported domain names, the IP address to which the transaction is to be sent, the port number to which the transaction is to be addressed, etc. are stored (see FIG. 3).

For example, turning now to FIG. 2, user Joe@corpa.com dials in 40 to $NAS_1$. A PPP (point to point protocol) session is raised between Joe and NAS,. An IPCP (internet protocol control protocol) session 42 is raised between $NAS_1$, and proxy service 44. In response $NAS_1$ sends a RADIUS (Remote Authentication Dial-In User Service protocol) access-request to proxy service 44. Proxy service 44 then consults its local configuration database 16. Proxy service 44 then makes a determination about where to send the access-request packet. Here it decides to send it to the AAA service 48 maintained in the $Corp_A$ domain 50. The $Corp_A$ AAA 48 then consults its local database 52 and authenticates joe@corpa.com. $Corp_A$ AAA 48 then returns an access-accept packet to proxy service 44 which, in turn, sends an access-accept packet to $NAS_1$ completing the log-in of joe@corpa.com.

When the subscriber is granted access, or leaves the network, the accounting transactions will now have to be shared with the wholesale customers of the ISP/Telco. That is, the ISP/Telco will keep a record with which to bill or otherwise account to $CorP_A$ for services rendered and the record will also need to be sent to $Corp_A$'s AAA. Typically, the wholesale provider (e.g., the ISP) will use a roaming service product such as the Global Roaming Server™ (GRS), a product of Cisco Systems, Inc. of San Jose, Calif., to achieve this objective. In the retail case, the ISP/Telco will use a product like Cisco Secure™, a product of Cisco Systems, Inc., to act as an authentication, authorization and accounting (AAA) service to authenticate and authorize the user. This approach, however, poses some problems for the ISP/Telco.

The ISP/Telco needs to maintain two different sets of NASes as diagrammed in FIG. 4 or it has to pipe all transactions through a GRS (proxy service) as diagrammed in FIG. 5 which then has to make a decision as to whether the access-request transaction will be locally processed by the ISP/Telco (retail user) or remotely processed by the wholesale customer (wholesale user). The two products are independent products which maintain their own databases. They do not at present support a distributed architecture and hence will not scale by the number of PoPs users, etc. This poses the problem that multiple instantiations of the GRS will need to be configured and will not be able to properly load balance among the various NASes available at the PoP. Furthermore, should a GRS go down, the PoP may lose the services of the NASes in communication with the GRS that failed.

Accordingly, it would be desirable to provide a capability for allowing ISPs and Telcos to seamlessly offer wholesale and retail data communications network access, unify the disparate systems that specialize in these access control segments and scale both systems to simultaneously reside on a plurality of PoPs while behaving in a distributed manner within the data communications network.

SUMMARY OF THE INVENTION

A single database maintained centrally hosts both proxy service data and authentication, authorization and accounting (AAA) data. Data is then copied to storage used locally by each system when both systems are instantiated. Therefore the ISP/Telco need not maintain two different data bases. A protocol gateway (PGW) is used to determine if the incoming user is a wholesale or retail user. The PGW filters the domain portion of the access request to locate a remote AAA service. If one such service is found, the PGW routes the communication via the GRS to proxy it to the remote AAA service. The returned packet from the remote AAA service is then searched for an IP address to be assigned to the incoming user. If one is not found the PGW obtains a dynamically allocated IP address from a DHCP server (using an IP-Pool-ID if supplied in the returned packet from the remote AAA service). The same mechanism is used to forward accounting event packets from the NAS to the remote AAA service. The PGW may monitor more than one proxy service and/or AAA service and load balance among them.

DETAILED DESCRIPTION OF THE PREFERRED EMBODIMENTS

Figure 1:
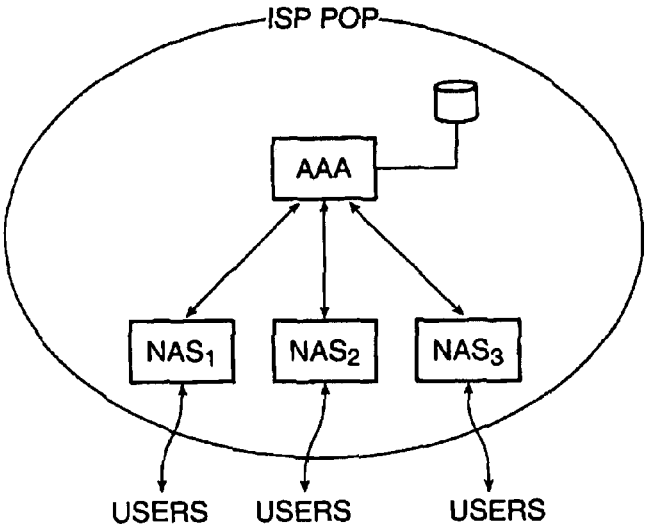
FIG. 1 PRIOR ART
FIG. 1 is a system block diagram of a simple ISP PoP using a conventional retail-only paradigm.
Figure 2:
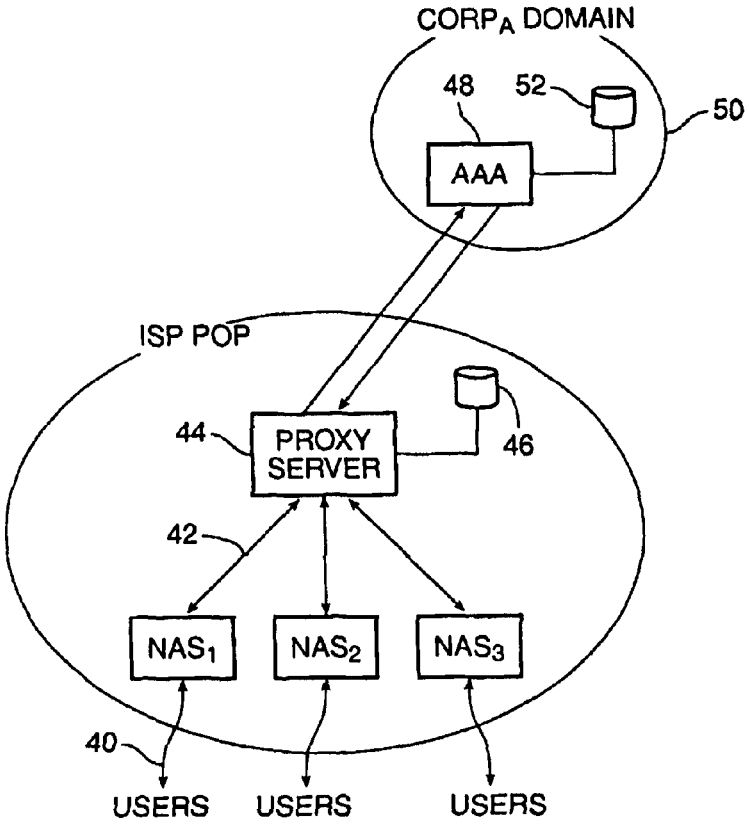
FIG. 2 PRIOR ART
FIG. 2 is a system block diagram of wholesale ISP PoP using a conventional wholesale-only paradigm.
Figures 3, 4:
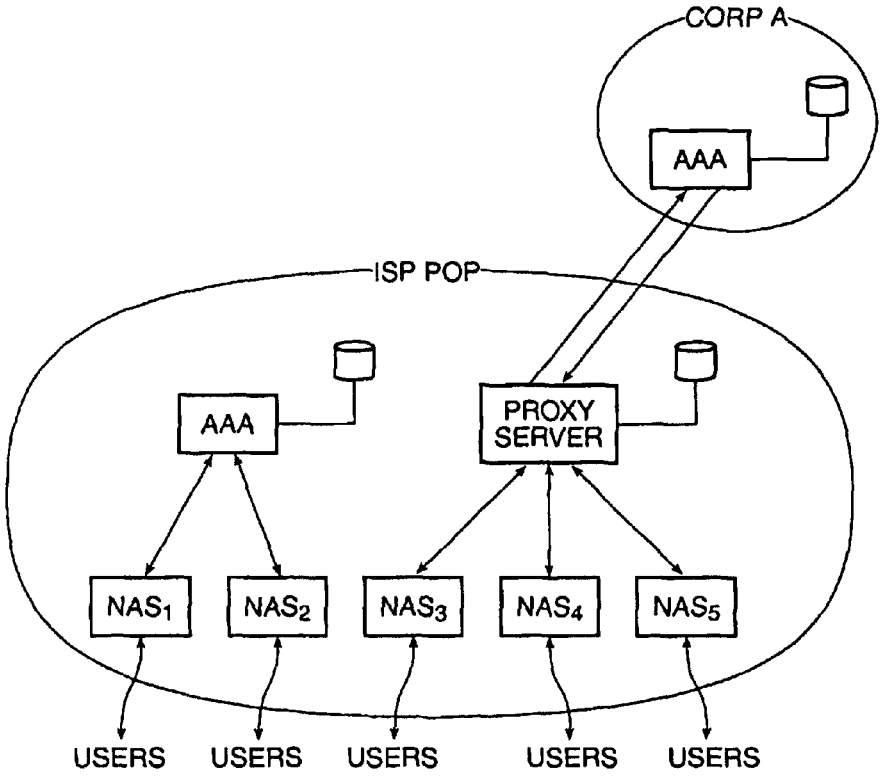
FIG. 3 PRIOR ART
FIG. 4 PRIOR ART
FIG. 3 is a diagram illustrating the information maintained by a conventional proxy server.
FIG. 4 is a system block diagram of an ISP PoP having non-integrated retail and wholesale components.
Figure 5:
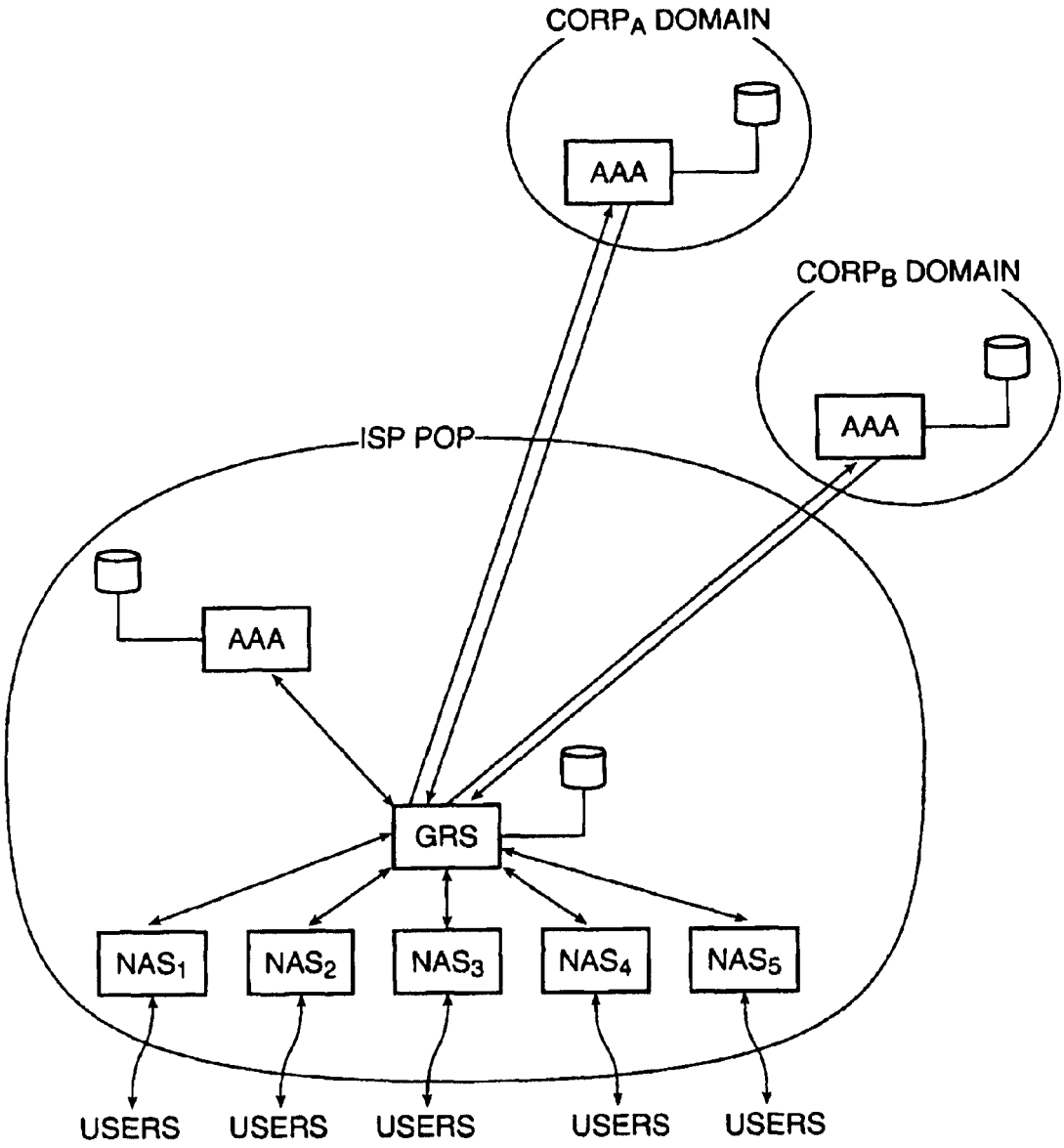
FIG. 5 PRIOR ART
FIG. 5 is a system block diagram of an ISP PoP using a Global Roaming Server (GRS) proxy service to integrate wholesale and retail functions.

Those of ordinary skill in the art will realize that the following description of the present invention is illustrative only and not in any way limiting. Other embodiments of the invention will readily suggest themselves to such skilled persons after a perusal of the within disclosure.

In accordance with a presently preferred embodiment of the present invention, the components, processes and/or data structures are implemented using a gateway device and other services implemented using C++ programs running on an Enterprise 2000™ server running Sun Solaris™ as its operating system. The Enterprise 2000™ server and Sun Solaris™ operating system are products available from Sun Microsystems, Inc. of Mountain View, Calif. Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

The protocol gateway (PGW or gateway) is a device which couples the user via a network access server (NAS) to the data communications network. The term gateway is not meant to be limited to a single type of device, as any device, hardware or software, that may act as a bridge between the user and the network may be considered a gateway for the purposes of this application. In accordance with a presently preferred embodiment of the present invention, the PGW is a software service operating on a general purpose computer running the User Control Point (UCP) software package available from Cisco Systems, Inc. of San Jose, Calif.

The authentication, authorization and accounting (AAA) service performs user authentication, user authorization and user accounting functions. It may be a Cisco ACS™ product such as Cisco Secure™, available from Cisco Systems, Inc. of San Jose, Calif., or an equivalent product. In accordance with a presently preferred embodiment of the present invention, the Remote Authentication Dial-In User Service (RADIUS) protocol is used as the communication protocol between the gateway and the AAA and GRS proxy services. RADIUS is an Internet standard track protocol for carrying authentication, authorization, accounting and configuration information between devices that desire to authenticate their links and a shared AAA or GRS service. Those of ordinary skill in the art will *now* realize that *systems, methods and apparatuses may employ* other Internet protocols such as TACACS+ [can be used] as acceptable authentication communications links between the various communications devices that encompass the data communications network and still be within the inventive concepts disclosed herein. The global roaming service (GRS) is also [a] *an* AAA service which is capable of proxying transactions to remote AAA [service] *services*. It also preferably uses the RADIUS protocol or an equivalent.

One way in which the present invention may come into use involves the concept of roaming users. A roaming user is, for example, a traveling person with a lap top. If the person wants to reach a corporate intranet or local ISP, he or she can (1) dial the number of the home PoP (point of presence) and incur potentially large telephone bills; (2) dial a "toll free" number such as an 800 number which can also be expensive—to the provider; or (3) use a global roaming server model. In the global roaming server model, ISPs with PoPs in different locations make cross-agreements with one another so as to provide local telephone access numbers to ISPs without any other (or a sufficient) presence in a location. To the user, it appears that his ISP has PoPs everywhere that there is a roaming agreement in place with a cooperating ISP.

A global roaming service ("GRS") at a PoP can parse the fully qualified domain name ("FQDN") of the user (e.g., joe@ISPA.NET) and determine that Joe belongs to ISPA-.NET. The GRS can then send an authentication request to ISPA-NET's AAA server to authenticate and authorize Joe in a conventional manner. Accounting event information, e.g., accounting start packets associated with log-in and accounting stop packets associated with log-out, are sent both to the GRS at the local PoP and to ISPA.NET's AAA server to enable the local PoP to account for use by Joe at the local PoP and so bill ISPA.NET, if desired, and to allow ISPA.NET to bill Joe, if desired. It also provides a mechanism for tracking this type of usage which can serve a number of purposes.

GRSes have their own associated databases which keep lists of remote AAAs, their IP addresses, their port numbers and their associated domain names.

Figure 6:
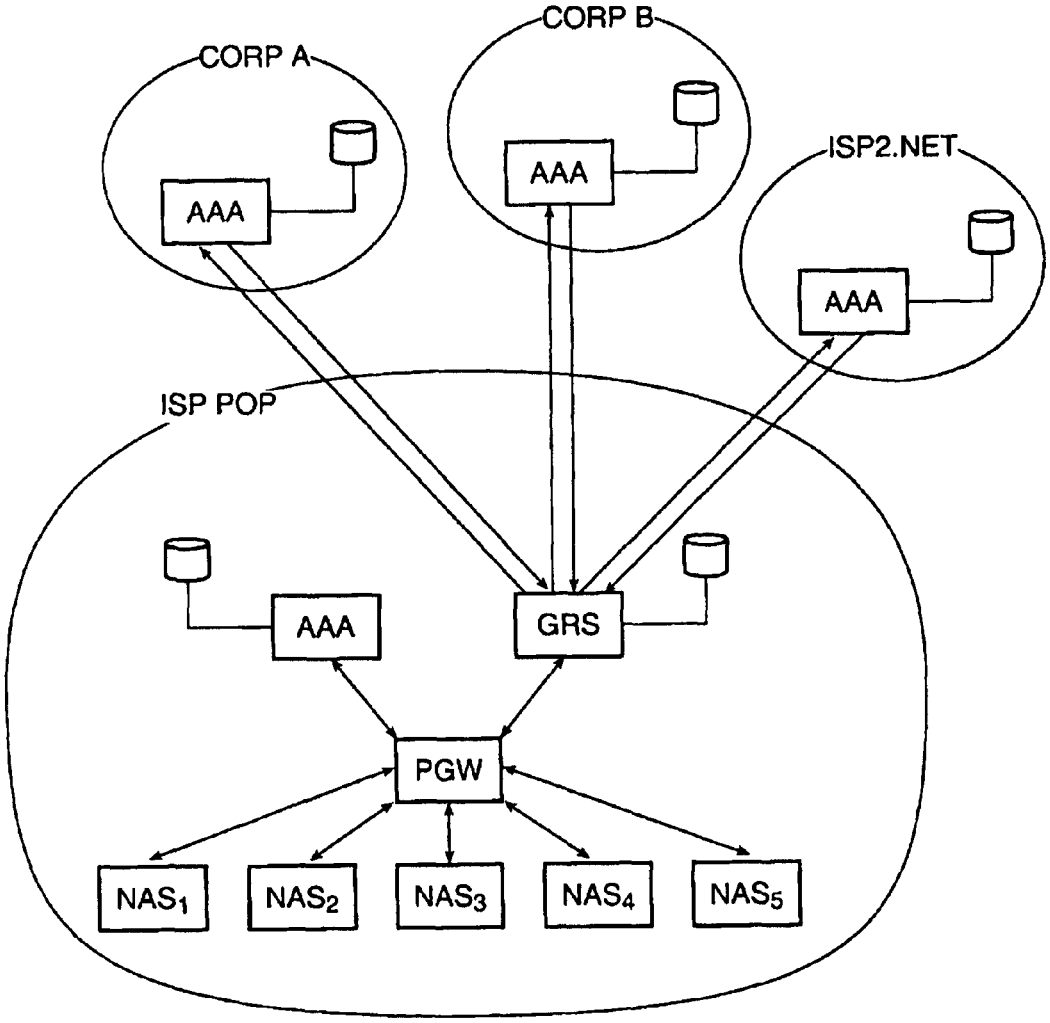
FIG. 6 is a system block diagram of an ISP PoP using a protocol gateway (PGW) in accordance with a presently preferred embodiment of the present invention to integrate wholesale and retail functions and perform load balancing.

To render the roaming model more tenable to the myriad IPSs and Telcos which might see fit to enter into these cross-agreements and thus make roaming easier for the end users, the process must be simplified and made scaleable. Under the prior model, as shown in FIG. 6, each GRS and AAA had its own associated stand-alone, database which required maintenance from time to time. Multiple instances of such databases required individual maintenance. In many situations NAS resources were committed to a particular AAA or GRS at a PoP and not capable of load balancing.

Figure 7:
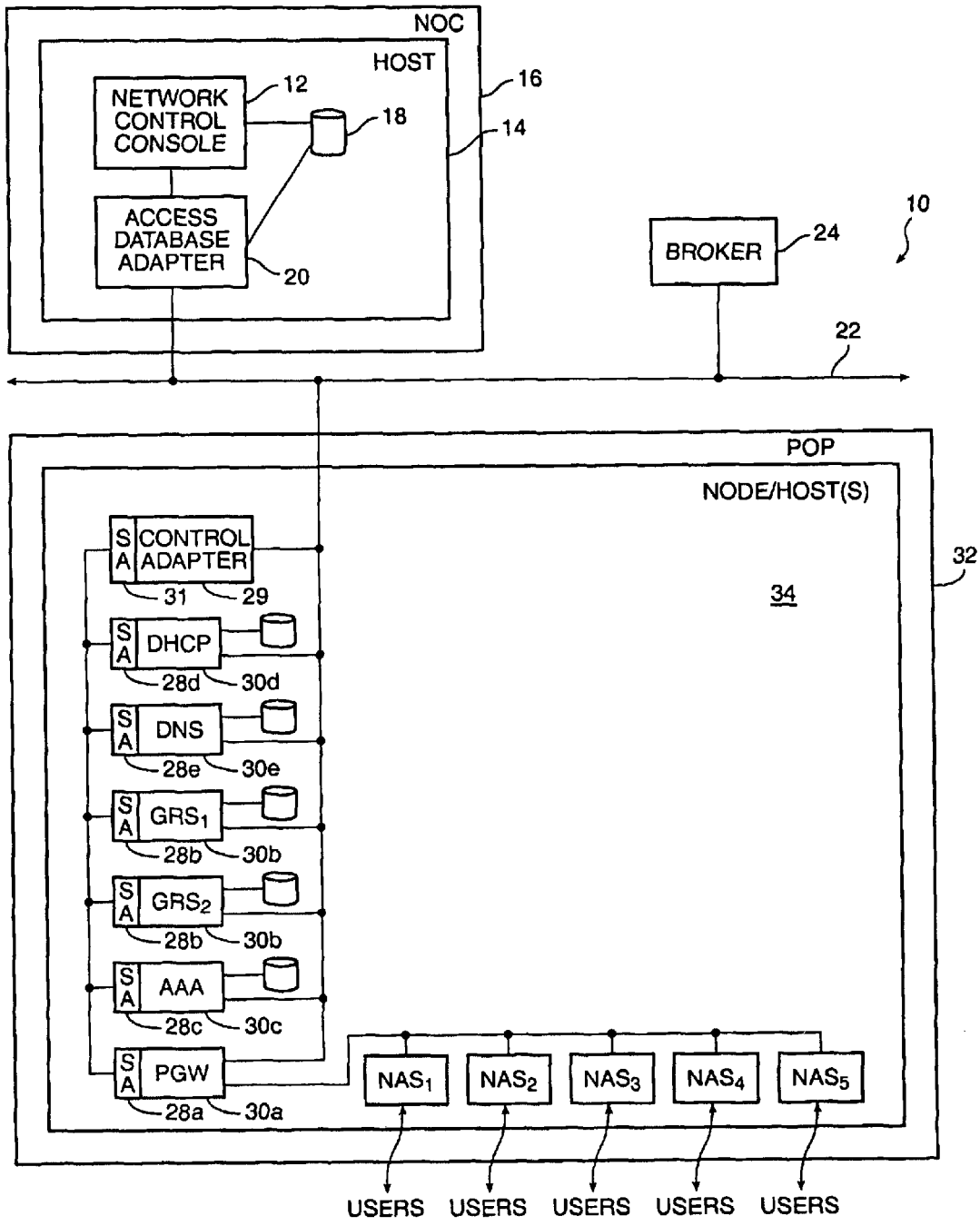
FIG. 7 is a system block diagram of an ISP NOC, broker publisher system and PoP in accordance with another preferred embodiment of the present invention.

FIG. 7 is a system block diagram of an improved system in accordance with a presently preferred embodiment of the present invention. A data communications network 10 such as the internet, or an ISPs presence on the internet, or a corporate intranet, or the like, includes a network control console (NCC) 12 which is physically located on a host 14 within a Network Operations Center (NOC) 16. The NCC 12 is an application running on the host 14. The NCC 12 monitors and manages the data communications system. The NCC 12 is in communication with a database 18 and an access database adapter 20.

The database 18 and access database adapter 20 can run on the same host 14 as the NCC 12, as depicted in FIG. 7, or the database 18 and the access database adapter 20 can be located on more than one device. The database 18 stores information related to the various components and services comprising the data communications network. 10 being managed. The system administrator accesses the information in the database 18, as needed, in conjunction with the NCC 12, to perform the overall network management task. The access database adapter 20 is in communication with both the database 18 and the NCC 12. This adapter, and other adapters in the invention, provide bi-directional mapping of information between the NCC 12 and other services comprising the data communications network 10. Adapters, such as the access database adapter 20 subscribe to and publish events. An event is an independent entity which contains an unspecified amount of non-time critical information. For example, the access database adapter 20 receives commands from the NCC 12 to publish an event. The information contained in the event may be found in the NCC's request or the access database adapter 20 may communicate with the database 18 to find the required information. A detailed discussion of some of the specific events pertinent to this invention and the information found therein is provided later in this disclosure. The event is then published to other services and components within the data network management system across an information bus 22 which may be the data communications network itself.

The information bus 22 that serves as the transportation medium for the presently preferred embodiment of the present invention can be Common Object Request Broker Architecture (CORBA)-based. The CORBA-based information bus is capable of handling the communication of events to and from objects in a distributed, multi-platform environment. The concept of a CORBA-based information bus is well known by those of ordinary skill in the art. Other acceptable communication languages can be used as are also known by those of ordinary skill in the art.

CORBA provides a standard way of executing program modules in a distributed environment. A broker 24, therefore, may be incorporated into an Object Request Broker (ORB) within a CORBA compliant network. To make a request of an ORB, a client may use a dynamic invocation interface (which is a standard interface which is independent of the target object's interface) or an Object Management Group Interface Definition Language (OMG IDL) stub (the specific stub depending on the interface of the target object). For some functions, the client may also directly interact with the ORB. The object is then invoked. When an invocation occurs, the ORB core arranges so a call is made to the appropriate method of the implementation. A parameter to that method specifics the object being invoked, which the method can use to locate the data for the object. When the method is complete, it returns, causing output parameters or exception results to be transmitted back to the client.

Figure 8:
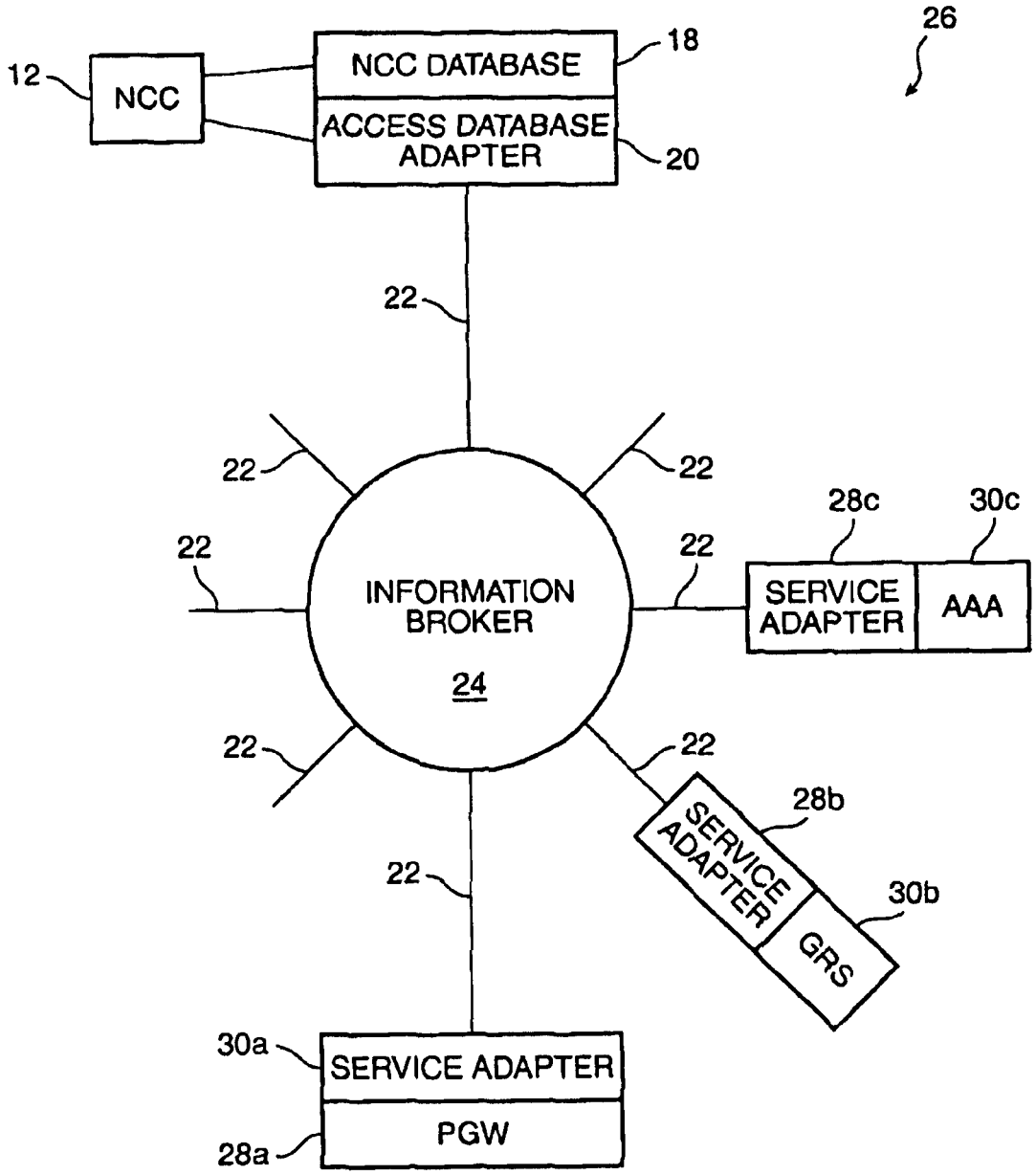
FIG. 8 is a system block diagram of a broker publisher system used in accordance with a preferred embodiment of the present invention.
Figure 9:
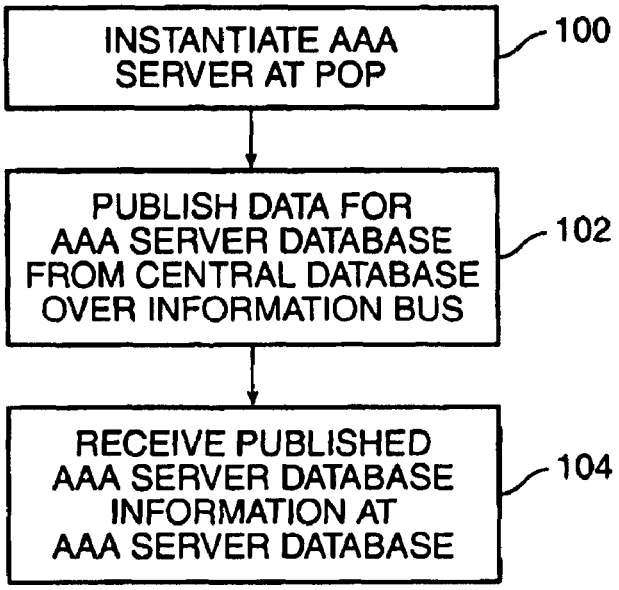
FIG. 9 is a flow diagram detailing a process by which the AAA service and its associated database are instantiated in accordance with a presently preferred embodiment of the present invention.

In accordance with a presently preferred embodiment of the present invention an Enterprise Application Integration (EAT) system is used to broker the flow of information between the various services and adapters comprising the data network management system of the present invention. An example of an EAI system that can be incorporated in the presently preferred invention is the ActiveWorks Integration System, available from Active Software of Santa Clara, Calif. As shown in FIG. 8, such an EAI system 26 uses an information broker 24 as the hub of the system. The information broker 24 acts as the central control and storage point for the system. The information broker 24 can reside on a server and serves to mediate requests to and from networked clients; automatically queuing, filtering and routing events while guaranteeing delivery. The information broker 24 is capable of storing subscription information and using such subscription information to determine where published information is to be sent. Referring back to FIG. 7, the information broker 24 is shown as being located at a point along the information bus 22. In most instances the, broker will be located within the same NOC 16 as the host 14 that runs the NCC 12 application. Another key feature to the EAI system 26 of FIG. 8 is the use of adapters 28a, 28b, and 28c that allow users of the EAI system 26 to integrate diverse applications and other information when using the integration system. Adapters 28a, 28b, and 28c provide bi-directional mapping of information between an application's native format and integration system events, enabling all custom and packaged applications, databases, and Internet and other network applications to exchange information. As shown in FIG. 8 the adapters 28a, 28b, and 28c run in association with the various services 30a, 30b, and 30c from which information is published and subscribed on to an information bus 22 that has its hub at the broker 24.

Referring back to FIG. 7 the information bus 22 is in communication with a Point of Presence (POP) 32 within the data communications network 10. The PoP 32 is one of many PoPs that the information bus 22 is in communication with. Located within PoP 32 is a host or node 34 which may comprise one or more computing devices on which some or all of the services shown in FIG. 7 may be running. The node 34 is in communication with the information bus 22 through a control adapter 29 which provides control communications with the various services 30a, 30b, 30c, 30d, 30e through their respective service adapters 28a, 28b, 28c, 28d, 28e via service adapter 31 of control adapter 29.

By way of example, the node 34 of FIG. 7 is configured with a PGW 30a, an authentication, authorization and accounting (AAA) service 30c, a domain name system (DNS) service 30e, a dynamic host configuration protocol (DHCP) service 30d and a pair of GRS services 30b. Those of ordinary skill in the art will appreciate that the services shown are not intended to be limiting and that other services and other service configurations can be used without departing from the inventive concepts herein disclosed. The system services may also be distributed over two or more servers to provide improved performance and redundancy.

The protocol gateway service 30a is used to couple the network user to the data communication network. The protocol gateway service 30a functions as an interface to the NASes that allows access requests received from a user to be serviced using components that may communicate using different protocols. A typical protocol gateway service 30a may be able to support different user access methodologies, such as dial-up, frame relay, leased lines, ATM (Asynchronous Transfer Mode), ADSL (Asymmetric Digital Subscriber Line) and the like. Used in conjunction with the protocol gateway service 30a, the AAA service 30c performs user authentication, authorization and accounting functions. The AAA service 30c stores user profile information and tracks user usage. The profile information stored in the AAA service 30c is proxied to the protocol gateway service 30a when a network user desires network access.

The DNS service 30e is used to return Internet protocol (IP) addresses in response to domain names received, for example, from a protocol gateway service 30a. For example, if the DNS service 30e receives a domain name query from the protocol gateway service 30a, it has the capability to locate the associated numerical IP address from within the memory of the DNS service (or another DNS service) and return this numerical IP address to the protocol gateway service 30a.

The DHCP service 30d is used as a dynamic way of assigning IP addresses to the network users as well known to those of ordinary skill in the art.

Each of these services 30a, 30b, 30c, 30d, 30e is in communication with a corresponding service adapter 28a, 28b, 28c, 28d, 28e. The service adapter subscribes to and publishes various events on the information bus 22. The service adapter is configured so that it subscribes to events published by the access database adapter 20 of the NCC 12. The service adapter also publishes events to the access database adapter 20 of the NCC 12.

The following is an exemplary listing and definition of some of the events published by and subscribed to by the access database adapter and the service adapters which are pertinent to this invention. This listing is by way of example and is not intended to be exhaustive or limiting in any way. Other events are possible and can be used in this invention without departing from the inventive concepts herein disclosed.

The NCC 12 publishes "configure" events to the service adapters 28a, 28b, 28c, 28d, 28e. Configure events are published to configure the service adapters upon initial start up of the service adapters or to modify a preexisting configuration. A configure event can be delivered to a service adapter directly from the access database adapter 20 at the NCC 12. The service adapters update their corresponding configuration files upon receiving a configure event. An example of the information contained within a configure event includes the GUID (global unique identifier) of the publisher, the GUID of the subscriber, listening port configuration, sink port configuration, protocol handler information, engine data and facility data.

The NCC 12 publishes "start" events that are subscribed to by a control adapter such as control adapter 29 associated with a host computer at a node to cause the control adapter to start up one or more specific services. Since the control adapter is always responsible for starting a service, the start events are always subscribed to by the control adapters as opposed to the service adapters. An example of the information contained within a start event includes the GUID of the publisher, the GUID of the subscribing control adapter, the GUID of the service to be started, the service name and the absolute path where the service binary resides. The access database adapter 20 of the NCC 12 also publishes "stop" events that are subscribed to by the control adapter to cause the control adapter to shut down a specific service or multiple services. Since the control adapter is always responsible for stopping a service, the stop events are always subscribed to by the control adapter as opposed to the service adapters. Once the control adapter receives the stop event, it publishes a stop event to the service adapter of the corresponding service. The control adapter allows the service sufficient time to shut down. If the service does not respond to the stop event and continues running, the control adapter can explicitly kill the service based on the process ID found in the configuration file. An example of information contained within a start event includes the GUID of the publisher, the GUID of the subscribing control adapter, the GUID of the service to be stopped and the name of the service to be stopped.

Other events may be published and subscribed to.

The configure event is used to publish the current contents of a master database relevant to GRS and AAA services at the various nodes of the data communications network. Thus the master database may be maintained and serviced at the NOC or some other convenient facility and the AAA services and GRS services updated with information automatically without the need to manually update their separate databases.

The PGW is used as a protocol gateway between the NASes and the AAA and GRS services. The PGW parses the FQDN of incoming users and sends access requests from local users to the local AAA and access requests for roaming users to the GRS. The GRS, in turn, forwards the access requests to the remote AAA belonging to the user's provider in accordance with the conventional proxy model.

The PGW has the ability to load balance by monitoring the condition and response times of its respective GRS services and AAA services. Thus, if one such services is particularly loaded, incoming calls may be directed to other services. If one such server has crashed or becomes non responsive, it may be bypassed. In the present configurations where NASes are directly connected to a GRS and or an AAA service, a dead service can result in the NASes connected to the dead service becoming non-responsive. This condition is avoided by using the PGW as a front end to the GRS and AAA service.

In accordance with the present invention IP addresses may be assigned to incoming users in a number of ways. For users having permanently or otherwise allocated IP addresses reflected in their user service profiles in their respective AAA services, they will receive that address. This is done by returning the IP address in the access-accept packet ultimately returned to the NAS via the PGW.

For users of the local ISP who do not have pre-allocated IP addresses, a DHCP (dynamic host control protocol) service such as one running in a host at the PoP will provide a DHCP IP address from a pool of such addresses assigned to the ISP.

For wholesale users, an IP address may be returned from a DHCP service running remotely at their provider, it may be assigned by the ISP as if the user were a retail user of the ISP, or a separate pool of IP addresses maintained locally at the ISP on behalf of the provider can be identified by the access-accept packet and an address selected therefrom by the local DHCP service.

Figure 10:
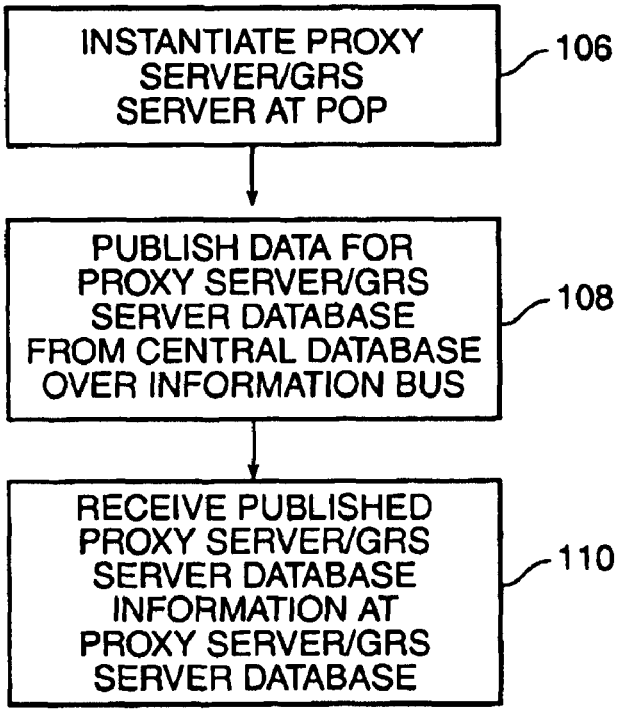
FIG. 10 is a flow diagram detailing a process by which a proxy service and its associated database are instantiated in accordance with a presently preferred embodiment of the present invention.

Turning now to FIGS. 9–12, FIG. 9 is a flow diagram detailing the process whereby the AAA service and its database at a PoP are instantiated. The AAA service is preferably started (100) with a command entered at the NCC 12 within NOC 16. The start command is passed over information bus 22 to information broker 24 which publishes it to subscribing entities such as a control adapter at the PoP. The control adapter responds by starting the process. Once the process is started a configure command at the NCC causes publication (102) of database elements which are used to populate (104) the database of the AAA service at the PoP. This is preferably done using the broker-publisher mechanism described above with the AAA service or its database being the subscriber to the published information. FIG. 10 details a similar process for loading the database of a proxy or GRS server at the PoP.

Figure 11:
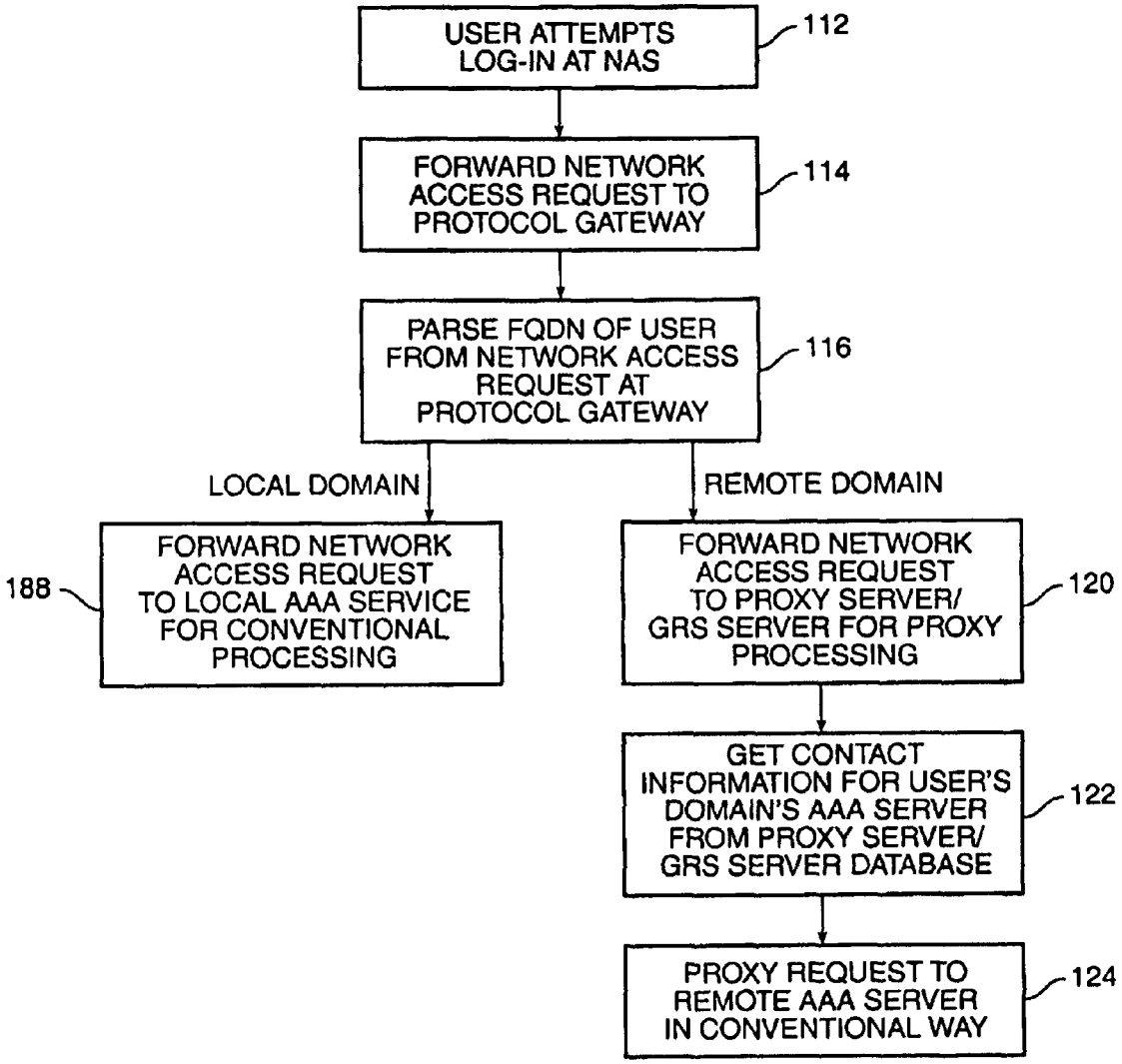
FIG. 11 is a flow diagram detailing a user authentication and authorization process in accordance with a presently preferred embodiment of the present invention.

FIG. 11 details the process whereby a user is authenticated and authorized in accordance with a presently preferred embodiment of the present invention. At reference numeral 112 the user attempts a log-in by dialing in to a NAS at the PoP. At reference numeral 114 the network access request from the NAS is forwarded to a protocol gateway for processing. At reference numeral 116 the protocol gateway parses the FQDN of the user. If the FQDN indicates that the user's domain is processed directly at the PoP's AAA service, then the access request is forwarded there (118). Processing proceeds in a conventional manner. If the FQDN indicates that the user is to be authenticated remotely, then at reference numeral 120 the protocol gateway forwards the network access request to a proxy server or GRS server at the PoP for proxy processing. At reference numeral 122 the proxy/GRS server looks up the user's domain AAA contact information (e.g., address, port number) from the database associated with the proxy/GRS server and populated as described above. At reference numeral 124 the proxy/GRS server proxies the access request to the now-identified remote AAA service at the user's domain site. Processing proceeds in a conventional manner from this point on.

Figure 12:
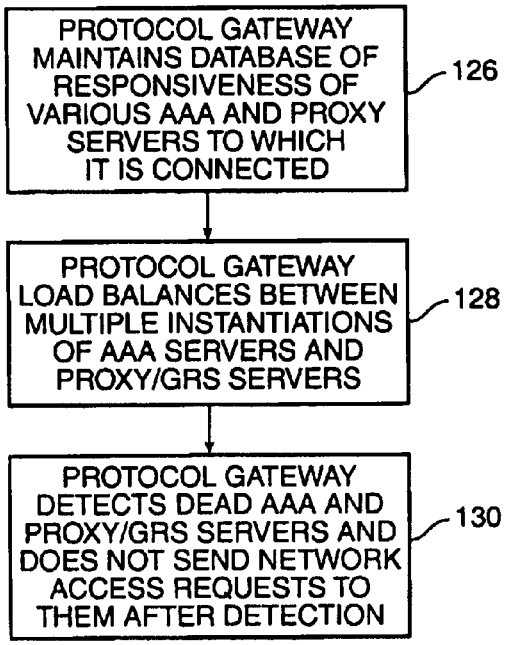
FIG. 12 is a flow diagram detailing a load balancing process in accordance with a presently preferred embodiment of the present invention.

FIG. 12 details the flow of the process by which the protocol gateway may load balance among multiple instantiations of AAA services and/or GRS/proxy services. At reference numeral 126 the protocol gateway maintains a database indicative of the responsiveness of the various AAA services and proxy/GRS services with which it is in contact at the PoP. Since it is sending requests to the services all the time as users attempt to log-in, and because the service must acknowledge receipt of the requests in a conventional manner, it is a simple matter to determine the response time of the service at any given moment. Also, since the protocol gateway is feeding all of the access requests to their respective services, it is simple to track how many are being forwarded at any given time at the PoP.

At reference numeral 128 the protocol gateway load balances by distributing network access requests among the relevant services in a manner designed to more or less equally share the load. Any convenient mechanism may be used, such as a round-robin schedule or another conventional scheduling algorithm.

At reference numeral 130 the protocol gateway detects non-responsive services and bypasses them. An error condition event may also be published to allow other components of the data communications network to become aware of the failure.

Figure 13:
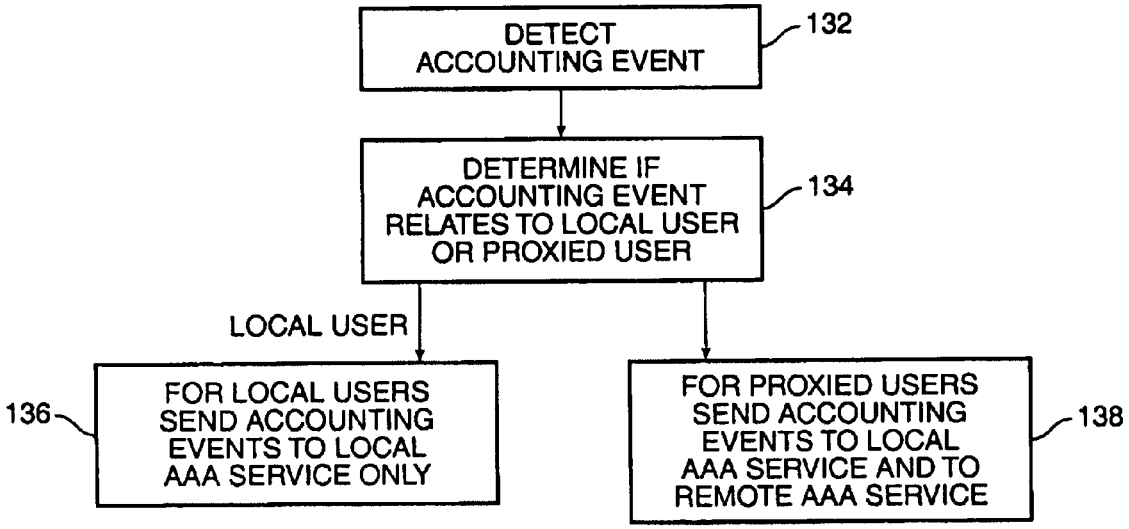
FIG. 13 is a flow diagram detailing an accounting process in accordance with a presently preferred embodiment of the present invention.

Turning finally to FIG. 13 a flow diagram of a process whereby accounting event records are distributed is shown. At reference numeral 132 an accounting event is detected. This could be, for example, an accounting start event or an accounting stop event detected at the protocol gateway. At reference numeral 134 the nature of the connection is determined. If it is a local user of the PoP, then the accounting event information is sent only to the local AAA service at reference numeral 136. If it is a proxy user, then at reference numeral 138 the accounting event is sent both to the local AAA service as well as to the proxied AAA service.

Alternative Embodiments

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A method *executing on a hardware computer* for managing network access to a data communications network, said method comprising:

maintaining a central database;

maintaining at least one authentication, authorization and accounting (AAA) service at a point of presence (PoP) of the data communications network; and configuring a database associated with the AAA service from the central database, wherein said configuring includes publishing information from said central database on an information bus as at least one event, said AAA service subscribing to said event so as to receive said published information so as to thereby update its associated database;

*further comprising:*

*receiving at a protocol gateway in the PoP a network access request from a user through a network access server (NAS);*

*parsing the network access request for an identification of the user's domain;*

*routing the network access request to the AAA service at the PoP if the user's domain corresponds to that of the PoP;*

*looking up a domain identification entry corresponding to the user's domain in the AAA service's database if the user's domain does not correspond to that of the PoP;*

*proxying the network access request to an AAA service in the user's domain at an address and port as specified in the domain identification entry of the database if the user's domain does not correspond to that of the PoP.*

[2. A method in accordance with claim 1, further comprising:

receiving at a protocol gateway in the PoP a network access request from a user through a network access server (NAS);

parsing the network access request for an identification of the user's domain;

routing the network access request to the AAA service at the PoP if the user's domain corresponds to that of the PoP;

looking up a domain identification entry corresponding to the user's domain in the AAA service's database if the user's domain does not correspond to that of the PoP; proxying the network access request to an AAA service in the user's domain at an address and port as specified in the domain identification entry of the database if the user's domain does not correspond to that of the PoP.]

3. [A] *The* method *executing on the hardware computer* in accordance with claim [2] *1*, further comprising:

obtaining an IP address for the user from the AAA service in the user's domain if the user's domain does not correspond to that of the PoP.

4. [A] *The* method *executing on the hardware computer* in accordance with claim [2] *1*, further comprising:

assigning an IP address to the user from a local DHCP pool of IP [address] *addresses* if the user's domain does not correspond to that of the PoP.

5. [A] *The* method *executing on the hardware computer* in accordance with claim [2] *1*, further comprising:

assigning an IP address to the user from an IP address pool identified in an access-accept packet received from the user's domain's AAA service if the user's domain does not correspond to that of the PoP.

6. A method *executing on a hardware computer* for managing network access to a data communications network, said method comprising:

maintaining a central database;

maintaining a plurality of authentication, authorization and accounting (AAA) services at a point of presence (PoP) of the data communication network; and configuring databases associated with the AAA services from the central database, wherein said configuring includes publishing information from said central database on an information bus as at least one event, said AAA services subscribing to said event so as to receive said published information so as to thereby update their associated databases*;*

*further comprising:*

*receiving at a protocol gateway in the PoP a network access request from a user through a network access server (NAS);*

*parsing the network access request for an identification of the user's domain;*

*routing the network access request to one of said plurality of AAA services at the PoP if the user's domain corresponds to that of the PoP while load balancing among said plurality of AAA services;*

*looking up a domain identification entry corresponding to the user's domain in one of said plurality of AAA service's databases if the user's domain does not correspond to that of the PoP;*

*proxying the network access request to an AAA service in the user's domain at an address and port as specified in the domain identification entry of the database if the user's domain does not correspond to that of the PoP.*

[7. A method in accordance with claim 6, further comprising:

receiving at a protocol gateway in the PoP a network access request from a user through a network access server (NAS);

parsing the network access request for an identification of the user's domain;

routing the network access request to one of said plurality of AAA services at the PoP if the user's domain corresponds to that of the PoP while load balancing among said plurality of AAA services;

looking up a domain identification entry corresponding to the user's domain in one of said plurality of AAA service's databases if the user's domain does not correspond to that of the PoP;

proxying the network access request to an AAA service in the user's domain at an address and port as specified in the domain identification entry of the database if the user's domain does not correspond to that of the PoP.]

8. [A] *The* method *executing on the hardware computer* in accordance with claim [7] *6*, further comprising:

obtaining an IP address for the user from the AAA service in the user's domain if the user's domain does not correspond to that of the PoP.

9. [A] *The* method *executing on the hardware computer* in accordance with claim [7] *6*, further comprising:

assigning an IP address to the user from a local DHCP pool of IP [address] *addresses* if the user's domain does not correspond to that of the PoP.

10. [A] *The* method *executing on the hardware computer* in accordance with claim [7] *6*, further comprising:

assigning an IP address to the user from an IP address pool identified in an access-accept packet received from the user's domain's AAA service if the user's domain does not correspond to that of the PoP.

11. A method *executing on a hardware computer* for managing network access to a data communications network, said method comprising:

maintaining a central database, said central database containing access information for authentication, authorization and accounting services associated with domains of the data communications network;

maintaining at a point of presence (PoP) of the data communications network at least one AAA service and at least one proxy service and at least one protocol gateway in communication with a network access server (NAS);

periodically publishing information contained in said central database;

subscribing at said AAA and said proxy service to information published from said central database;

receiving at a protocol gateway in the PoP a network access request from a user through a network access server (NAS);

parsing the network access request at the protocol gateway for an identification of the user's domain;

routing the network access request to an AAA service at the PoP if the user's domain corresponds to that of the PoP;

looking up access information within a domain identification entry corresponding to the user's domain in a database associated with the proxy server if the user's domain does not correspond to that of the PoP; and proxying the network access request to an AAA service in the user's domain at an address and port as specified in the access information if the user's domain does not correspond to that of the PoP.

12. [A] *The* method *executing on the hardware computer* in accordance with claim 11, further comprising:

obtaining an IP address for the user from an AAA service in the user's domain if the user's domain does not correspond to that of the PoP.

13. [A] *The* method *executing on the hardware computer* in accordance with claim 11, further comprising:

assigning an IP address to the user from a local DHCP pool of IP [address] *addresses* if the user's domain does not correspond to that of the PoP.

14. [A] *The* method *executing on the hardware computer* in accordance with claim 11, further comprising:

assigning an IP address to the user from an IP address pool identified in an access-accept packet received from the user's domain's AAA service if the user's domain does not correspond to that of the PoP.

15. A method *executing on a hardware computer* of managing network access requests to a data communications network, said method comprising:

receiving at a protocol gateway in a point of presence (PoP) of the data communications network a network access request from a user through a network access server (NAS);

parsing the network access request for an identification of the user's domain;

routing the network access request to one of the plurality of authentication, authorization and accounting (AAA) services associated with the PoP if the user's domain corresponds to that of the PoP while load balancing among the plurality of AAA services;

looking up a domain identification entry corresponding to the user's domain in a database if the user's domain does not correspond to that of the PoP;

proxying the network access request via one of a plurality of proxy services to an AAA service in the user's domain at an address and port as specified in the domain identification entry of the database if the user's domain does not correspond to that of the PoP while load balancing among the plurality of proxy services.

16. [A] *The* method *executing on the hardware computer* in accordance with claim 15, further comprising:

obtaining an IP address for the user from the AAA service in the user's domain if the user's domain does not correspond to that of the PoP.

17. [A] *The* method *executing on the hardware computer* in accordance with claim 15, further comprising:

assigning an IP address to the user from a local DHCP pool of IP [address] *addresses* if the user's domain does not correspond to that of the PoP.

18. [A] *The* method *executing on the hardware computer* in accordance with claim 15, further comprising:

assigning an IP address to the user from an IP address pool identified in an access-accept packet received from the user's domain's AAA service if the user's domain does not correspond to that of the PoP.

19. A method *executing on a hardware computer* for managing network access to a data communications network, said method comprising:

maintaining a central database, said central database containing access information for authentication, authorization and accounting (AAA) services associated with domains of the data communications network;

maintaining at a point of presence (PoP) of the data communications network a plurality of AAA services at least one AAA service and at least one proxy service and at least one protocol gateway in communication with a network access server (NAS);

periodically publishing information contained in said central database;

subscribing at said AAA and said proxy service to information published from said central database;

receiving at a protocol gateway in the PoP a network access request from a user through a network access server (NAS);

parsing the network access request at the protocol gateway for an identification of the user's domain;

routing the network access request to one of said plurality of AAA services at the PoP if the user's domain corresponds to that of the PoP while load balancing among said plurality of AAA services;

looking up access information within a domain identification entry corresponding to the user's domain in a database associated with one of said plurality of proxy services if the user's domain does not correspond to that of the PoP while load balancing among said plurality of proxy services; and proxying the network access request to an AAA service in the user's domain at an address and port as specified in the access information if the user's domain does not correspond to that of the PoP.

20. [A] *The* method *executing on the hardware computer* in accordance with claim 19, further comprising:

obtaining an IP address for the user from an AAA service in the user's domain if the user's domain does not correspond to that of the PoP.

21. [A] *The* method *executing on the hardware computer* in accordance with claim 19, further comprising:

assigning an IP address to the user from a local DHCP pool of IP [address] *addresses* if the user's domain does not correspond to that of the PoP.

22. [A] *The* method *executing on the hardware computer* in accordance with claim 19, further comprising:

assigning an IP address to the user from an IP address pool identified in an access-accept packet received from the user's domain's AAA service if the user's domain does not correspond to that of the PoP.

23. A method *executing on a hardware computer* of managing network access requests to a data communications network, said method comprising:

receiving at a protocol gateway in a point of presence (PoP) of the data communications network a network access request from a user through a network access server (NAS);

parsing the network access request for an identification of the user's domain;

routing the network access request to an authentication, authorization and accounting (AAA) service associated with the PoP if the user's domain corresponds to that of the PoP;

looking up a domain identification entry corresponding to the user's domain in a database if the user's domain does not correspond to that of the PoP;

proxying the network access request to an AAA service in the user's domain at an address and port as specified in the domain identification entry of the database if the user's domain does not correspond to that of the PoP.

24. [A] *The* method *executing on the hardware computer* in accordance with claim 23, further comprising:

obtaining an IP address for the user from the AAA service in the user's domain if the user's domain does not correspond to that of the PoP.

25. [A] *The* method *executing on the hardware computer* in accordance with claim 23, further comprising:

assigning an IP address to the user from a local DHCP pool of IP [address] *addresses* if the user's domain does not correspond to that of the PoP.

26. [A] *The* method *executing on the hardware computer* in accordance with claim 23, further comprising:

assigning an IP address to the user from an IP address pool identified in an access-accept packet received from the user's domain's AAA service if the user's domain does not correspond to that of the PoP.

27. A *hardware* system for data communications network access management, comprising:

a central database containing information identifying access information for authentication, authorization and accounting (AAA) services associated with domains of the data communications network;

a publisher, said publisher publishing information from said central database to subscribers over an information bus;

a point of presence (PoP) on the data communications network, said PoP including a protocol gateway in communication with at least one network access server (NAS);

an AAA service associated with said PoP and in communication with said protocol gateway, said AAA service subscribing to information published by said publisher; and a proxy service associated with the PoP and in communication with said protocol gateway, said proxy service subscribing to information published by said publisher, said protocol gateway receiving network access requests from users over the NAS, parsing the requests for domain identification and routing the requests for domains other than those associated with the PoP to the proxy service, said proxy service routing network access requests to AAA services in remote domains in accordance with said access information.

28. [A] *The hardware* system in accordance with claim 27, further comprising: an AAA database associated with said AAA service; and a proxy database associated with said proxy service, said AAA database populated at instantiation of said AAA service by receiving information published by said publisher from said central database, said proxy database populated at instantiation of said proxy service by receiving information published by said publisher from said *central* database.

29. A *hardware* system for data communications network access management, comprising:

a central database containing information identifying access information for authentication, authorization and accounting (AAA) services associated with domains of the data communications network;

a publisher, said publisher publishing information from said central database to subscribers over an information bus;

a point of presence (PoP) on the data communications network, said PoP including a protocol gateway in communication with at least one network access server (NAS);

a plurality of AAA services associated with said PoP and in communication with said protocol gateway, said AAA services subscribing to information published by said publisher; and a plurality of proxy services associated with said PoP and in communication with said protocol gateway, said proxy services subscribing to information published by said publisher, said protocol gateway receiving network access requests from users over the NAS, parsing the requests for domain identification and routing the requests for domains other than those associated with the PoP to one of said plurality of proxy services while load balancing among them, said proxy service routing network access requests to AAA services in remote domains in accordance with said access information.

30. [A] *The hardware* system in accordance with claim 29, further comprising:

a plurality of AAA databases associated with said respective AAA services; and a plurality of proxy databases associated with said respective proxy services, said AAA databases populated at instantiation of said respective AAA services by receiving information published by said publisher from said central database, said proxy databases populated at instantiation of said respective proxy services by receiving information published by said publisher from said *central* database.

*31. A method executing on a hardware computer for managing network access to a data communications network said method comprising:*

*maintaining a central database coupled to the data communications network;*

*maintaining at least a first authentication, authorization and accounting (AAA) service at a first point of presence (PoP) of the data communications network and second AAA service at a second PoP of the data communications network:*

*configuring a database associated with the first AAA service from the central database by transporting information from the central database over the data communications network to the database associated with the first AAA service; and*

*configuring a database associated with the second AAA service from the central database by transporting information from the central database over the data communications network to the database associated with the second AAA service;*

*further comprising:*

*receiving at a protocol gateway in the first PoP a network access request from a user through network access server (NAS);*

*parsing the network access request for an identification of the user's domain;*

*routing the network access request to the first AAA service at the first PoP if the user's domain corresponds to that of the first PoP;*

*looking up a domain identification entry corresponding to the user's domain in the first AAA service's database if the user's domain does not correspond to that of the first PoP;*

*proxying the network access request to an AAA service in the user's domain at an address and port as specified in the domain identification entry of the database if the user's domain does not correspond to that of the first PoP.*

*32. The method executing on the hardware computer of claim 31 further comprising:*

*periodically updating the database associated with the first AAA service from the central database by transporting information from the central database over the data communications network to the database associated with the first AAA service.*

*33. The method executing on the hardware computer of claim 32 further comprising:*

*periodically updating the database associated with the second AAA service from the central database by transporting information from the central database over the data communications network to the database associated with the second AAA service.*

*34. The method executing on the hardware computer of claim 31 further comprising:*

*obtaining an IP address for the user from the AAA service in the user's domain if the user's domain does not correspond to that of the first PoP.*

*35. The method executing on the hardware computer of claim 31 further comprising:*

*assigning an IP address to the user from a local DHCP pool of IP addresses if the user's domain does not correspond to that of the first PoP.*

*36. The method executing on the hardware computer of claim 31, further comprising:*

*assigning an IP address to the user from an IP address pool identified in an access-accept packet received from the user's domain's AAA service if the user's domain does not correspond to that of the first PoP.*

*37. A method executing on a hardware computer for managing network access to a data communications network, said method comprising:*

*maintaining a central database coupled to the data communications network;*

*maintaining a plurality of first authentication, authorization and accounting (AAA) services at a first point of presence (PoP) of the data communications network and a second AAA service at a second PoP of the data communications network;*

*configuring one or more databases associated with the first AAA services from the central database by transporting information from the central database over the data communications network to the database(s) associated with the first AAA services; and*

*configuring a database associated with the second AAA service from the central database by transporting information from the central database over the data communications network to the database associated with the second AAA service;*

*further comprising:*

*receiving at a protocol gateway in the first PoP a network access request from a user through a network access server (NAS);*

*parsing the network access request for an identification of the user's domain;*

*routing the network access request to one of said plurality of first AAA services at the first PoP if the user's domain corresponds to that of the first PoP while load balancing among said plurality of first AAA services;*

*looking up a domain identification entry corresponding to the user's domain in one of said plurality of first AAA service's database(s) if the user's domain does not correspond to that of the first PoP;*

*proxying the network access request to an AAA service in the user's domain at an address and port as specified in the domain identification entry of the database if the user's domain does not correspond to that of the first PoP.*

*38. The method executing on the hardware computer of claim 37 further comprising:*

*obtaining an IP address for the user from the AAA service in the user's domain if the user's domain does not correspond to that of the first PoP.*

*39. The method executing on the hardware computer of claim 37, further comprising:*

*assigning an IP address to the user from a local DHCP pool of IP addresses if the user's domain does not correspond to that of the first PoP.*

*40. The method executing on the hardware computer of claim 37 further comprising:*

*assigning an IP address to the user from an IP address pool identified in an access-accept packet received from the user's domain's AAA service if the user's domain does not correspond to that of the first PoP.*

*41. A method executing on a hardware computer for managing network access to a data communications network, said method comprising:*

*maintaining a central database coupled to the data communications network;*

*said central database containing access information for authentication, authorization and accounting (AAA) services associated with domains of the data communications network;*

*maintaining at a first point of presence (PoP) of the data communications network at least one first AAA service and at least one first proxy service and at least one first protocol gateway in communication with a network access server (NAS);*

*periodically transporting information contained in the central database from the central database, over the data communications network, to the first AAA service(s), the first proxy service(s) and the first protocol gateway(s);*

*receiving at a protocol gateway in the first PoP a network access request from a user through a network access server (NAS);*

*parsing the network access request at the first protocol gateway for an identification of the user's domain;*

*routing the network access request to an AAA service at the first PoP if the user's domain corresponds to that of the first PoP;*

*looking up access information within a domain identification entry corresponding to the user's domain in a database associated with the first proxy server if the user's domain does not correspond to that of the first PoP; and*

*proxying the network access request to an AAA service in the user's domain at an address and port as specified in the access information if the user's domain does not correspond to that of the first PoP.*

*42. The method executing on the hardware computer of claim 41, further comprising:*

*obtaining an IP address for the user from an AAA service in the user's domain if the user's domain does not correspond to that of the first PoP.*

*43. The method executing on the hardware computer of claim 41, further comprising:*

*assigning an IP address to the user from a local DHCP pool of IP addresses if the user's domain does not correspond to that of the first PoP.*

*44. The method executing on the hardware computer of claim 41, further comprising:*

*assigning an IP address to the user from an IP address pool identified in an access-accept packet received from the user's domain's AAA service if the user's domain does not correspond to that of the first PoP.*

*45. A method executing on a hardware computer for managing network access requests to a data communications network, said method comprising:*

*receiving at a protocol gateway in a first point of presence (PoP) of the data communications network a network access request from a user received through a network access server (NAS);*

*parsing the network access request for an identification of the user's domain;*

*routing the network access request to one of the plurality of authentication, authorization and accounting (AAA) services associated with the first PoP if the user's domain corresponds to that of the first PoP while load balancing among the plurality of AAA services;*

*looking up a domain identification entry corresponding to the user's domain in a database associated with the one AAA if the user's domain does not correspond to that of the first PoP;*

*proxying the network access request via one of a plurality of proxy services to an AAA service in the user's domain at an address and port as specified in the domain identification entry of the database if the user's domain does not correspond to that of the first PoP while load balancing among the plurality of proxy services.*

*46. The method executing on the hardware computer of claim 45, further comprising:*

*obtaining an IP address for the user from the AAA service in the user's domain if the user's domain does not correspond to that of the first PoP.*

*47. The method executing on the hardware computer of claim 45, further comprising*

*assigning an IP address to the user from a local DHCP pool of IP addresses if the user's domain does not correspond to that of the first PoP.*

*48. The method executing on the hardware computer of claim 45, further comprising:*

*assigning an IP address to the user from an IP address pool identified in an access-accept packet received from the user's domain's AAA service if the user's domain does not correspond to that of the first PoP.*

*49. A method executing on a hardware computer for managing network access to a data communications network, said method comprising:*

*maintaining a central database, said central database containing access information for authentication, authorization and accounting services associated with domains of the data communications network:*

*maintaining at a first point of presence (PoP) of the data communications network a plurality of AAA services at least one AAA service and at least one proxy service and at least one protocol gateway in communication with a network access server (NAS);*

*periodically transmitting information contained in said central database over the data communications network to said AAA and said proxy service;*

*receiving at a protocol gateway in the PoP a network access request from a user through a network access server (NAS) parsing the network access request at the protocol gateway for an identification of the user's domain:*

*routing the network access request to one of said plurality of AAA services at the first PoP if the user's domain corresponds to that of the first PoP while load balancing among said plurality of AAA services;*

*looking up access information within a domain identification entry corresponding to the user's domain in a database associated with one of said plurality of proxy services if the user's domain does not correspond to that of the first PoP while load balancing among said plurality of proxy services; and*

*proxying the network access request to an AAA service in the user's domain at an address arid port as specified in the access information if the user's domain does not correspond to that of the first PoP.*

*50. The method executing on the hardware computer of claim 49, further comprising:*

*obtaining an IP address for the user from an AAA service in the user's domain if the user's domain does not correspond to that of the first PoP.*

*51. The method executing on the hardware computer of claim 49, further comprising:*

*assigning an IP address to the user from a local DHCP pool of IP addresses if the user's domain does not correspond to that of the first PoP.*

*52. The method executing on the hardware computer of claim 49, further comprising:*

*assigning an IP address to the user from an IP address pool identified in an access-accept packet received from the user's domain's AAA service if the user's domain does not correspond to that of the first PoP.*

*53. A method executing on a hardware computer for managing network access requests to a data communications network, said method comprising:*

*periodically transmitting updating information contained in a central database over the data communications network to an authentication, authorization and accounting (AAA) service associated with a first point of presence (PoP) of the data communications network;*

*receiving at a protocol gateway in the first point of presence (PoP) of the data communications network a network access request from a user received through a network access server (NAS);*

*parsing the network access request for an identification of the user's domain;*

*routing the network access request to the AAA service associated with the first PoP if the user's domain corresponds to that of the first PoP;*

*looking up a domain identification entry corresponding to the user's domain in a database if the user's domain does not correspond to that of the first PoP;*

*proxying the network access request to an AAA service in the user's domain at an address and port as specified in the domain identification entry of the database if the user's domain does not correspond to that of the first PoP.*

*54. The method executing on the hardware computer of claim 53, further comprising:*

*obtaining an IP address for the user from the AAA service in the user's domain if the user's domain does not correspond to that of the first PoP.*

55. The method executing on the hardware computer of claim 53, further comprising:

assigning an IP address to the user from a local DHCP pool of IP addresses if the user's domain does not correspond to that of the first PoP.

56. The method executing on the hardware computer of claim 53, further comprising:

assigning an IP address to the user from an IP address pool identified in an access-accept packet received from the user's domain's AAA service if the user's domain does not correspond to that of the first PoP.

57. A hardware system for data communications network access management, comprising:

a central database containing information identifying access information for authentication, authorization and accounting (AAA) services associated with domains of the data communications network:

a first point of presence (PoP) on the data communications network, said first PoP including a protocol gateway in communication with at least one network access server (NAS);

an AAA service associated with said first PoP and in communication with said protocol gateway and the data communications network;

proxy service associated with the first PoP and in communication with said protocol gateway and the data communications network;

a transmitter, said transmitter transmitting information from said central database to said AAA service at said first PoP and said proxy service at said first PoP over the data communications network;

said protocol gateway receiving network access requests from users over the NAS, parsing the requests for domain identification and routing the requests for domains other than those associated with the first PoP to the proxy service, said proxy service routing network access requests to AAA services in remote domains in accordance with said access information.

58. The hardware system of claim 57, further comprising:

an AAA database associated with said AAA service at said first PoP;

a proxy database associated with said proxy service at said first PoP;

said AAA database populated at instantiation of said AAA service by receiving information transmitted said transmitter from said central database;

said proxy database populated at instantiation of said proxy service by receiving information transmitted by said transmitter from said database.

59. A hardware system for data communications network access management, comprising:

a central database containing information identifying access information for authentication, authorization and accounting (AAA) services associated with domains of the data communications network;

a first point of presence (PoP) on the data communications network, said first PoP including a protocol gateway in communication with at least one network access server (NAS);

a plurality of AAA services associated with said first PoP and in communication with said protocol gateway, said AAA services subscribing to information published by said publisher;

a plurality of proxy services associated with said first PoP and in communication with said protocol gateway, said proxy services subscribing to information published by said publisher; and a transmitter, said transmitter transmitting information from said central database over the data communications network to said plurality of AAA services associated with said first PoP and to said plurality of proxy services associated with said first PoP;

said protocol gateway receiving network access requests from users over the NAS, parsing the requests for domain identification and routing the requests for domains other than those associated with the first PoP to one of said plurality of proxy services while load balancing among them;

said proxy service routing network access requests to AAA services in remote domains in accordance with said access information.

60. The hardware system of claim 59, further comprising a plurality of AAA databases associated with said respective AAA services at said first PoP; and a plurality of proxy databases associated with said respective proxy services at said first PoP;

said AAA databases populated at instantiation of said respective AAA services by receiving information transmitted by said transmitter from said central database;

said proxy databases populated at instantiation of said respective proxy services by receiving information transmitted by said transmitter from said central database.

61. A hardware system for managing access to a data communications network, said system comprising;

means for communicating with a central database via the data communications network, the central database containing information identifying access information for authentication, authorization and accounting (AAA) services associated with domains of the data communications network;

means for communicating with a local AAA service associated with a local Point of Presence (PoP);

means for communicating with a remote AAA service via a local proxy service;

means for instantiating the local AAA service from the central database;

means for reaching a network access request from a user through a local network access server (NAS);

means for checking the network access request to determine an identification of the user's domain;

means for routing the network access request to the local AAA service if the users domain corresponds to that of the local PoP;

means for looking up a domain identification entry corresponding to the user's domain in the local AAA service's database if the user's domain does not correspond to that of the local PoP; and means for proxying the network access request to a remote AAA service in the user's domain at an address and port as specified in the domain identification entry of the database if the user's domain does not correspond to that of the local PoP.

62. A hardware system for managing access to a data communications network, said system comprising:

means for communicating with a central database via the data communications network, the central database

*containing information identifying access information for authentication, authorization and accounting (AAA) services associated with domains of the data communications network;*

*means for communicating with a plurality of local AAA services associated with a local Point of Presence (PoP);*

*means for communicating with a plurality of local proxy services associated with the local PoP;*

*means for communicating with a remote AAA service via a local proxy service; means for instantiating the local AAA services from the central database;*

*means for instantiating the local proxy services from the central database;*

*means for receiving a network access request from a user through local network access server (NAS);*

*means for checking the network access request to determine an identification of the user's domain;*

*means for routing the network access request to the local AAA service if the user's domain corresponds to that of the local PoP;*

*means for looking up a domain identification entry corresponding to the user's domain with the local AAA services if the user's domain does not correspond to that of the local PoP;*

*means for proxying the network access request to a remote AAA service in the user's domain at an address and port as specified in the domain identification entry of the local AAA services' database if the user's domain does not correspond to that of the local PoP; and*

*means for receiving network access requests from users over a network access server (NAS), parsing the requests for domain identification and routing the requests for domains other than those associated with the first PoP to one of said plurality of proxy services while load balancing among them;*

*said proxy service routing network access requests to the remote AAA service in accordance with said access information.*

*63. A method executing on a hardware computer for accounting for use of a data communications network, said method comprising:*

*means for communicating with a central database via the data communications network, the central database containing information identifying access information for authentication, authorization and accounting (AAA) services associated with domains of the data communications network;*

*means for communicating with at least one local AAA service associated with a local Point of Presence (PoP);*

*means for communicating with a remote AAA service;*

*means for instantiating the local AAA services from the central database;*

*means for receiving a network access request from a user through a local network access server (NAS);*

*means for checking the network access request to determine an identification of the user's domain;*

*means for routing accounting information associated with the user to the local AAA service if the user's domain corresponds to that of the local PoP;*

*means for looking up a domain identification entry corresponding to the user's domain with the local AAA services if the user's domain does not correspond to that of the local PoP;*

*means for routing the accounting information to a remote AAA service in the user's domain at an address and port as specified in the domain identification entry of the local AAA services' database if the user's domain does not correspond to that of the local PoP.*

*64. A method executing on a hardware computer for managing network access accounting in a data communications network, said method comprising:*

*maintaining a central database coupled to the data communications network;*

*maintaining at least a local authentication, authorization and accounting (AAA) service at a local point of presence (PoP) of the data communications network;*

*configuring a database associated with the local AAA service from the central database by transporting information from the central database over the data communications network to the database associated with the local AAA service;*

*receiving accounting information from a network access server (NAS) responsive to utilization of the data communications network by a user coupled to the data communications network through the NAS;*

*forwarding said accounting information to the local AAA service if the user's domain corresponds to that of the local PoP; and*

*forwarding said accounting information to a remote AAA service in the user's domain at an address and port as specified in the domain identification entry of the local AAA service's database if the user's domain does not correspond to that of the local PoP.*

*65. A hardware apparatus for managing network access accounting in a data communications network, said apparatus comprising:*

*means for maintaining a central database coupled to the data communications network;*

*means for maintaining at least a local authentication, authorization and accounting (AAA) service at a local point of presence (PoP) of the data communications network;*

*means for configuring a database associated with the local AAA service from the central database by transporting information from the central database over the data communications network to the database associated with the local AAA service;*

*means for receiving accounting information from a network access server (NAS) responsive to utilization of the data communications network by a user coupled to the data communications network through the NAS;*

*means for forwarding said accounting information to the local AAA service if the user's domain corresponds to that of the local PoP; and*

*means for forwarding said accounting information to a remote AAA service in the user's domain at an address and port as specified in the domain identification entry of the local AAA service's database if the user's domain does not correspond to that of the local PoP.*

*66. A hardware system for managing network access to a data communications network, said method comprising:*

*a central database coupled to the data network;*

*at least a first authentication, authorization and accounting (AAA) service at a first point of presence (PoP) of the data communications network and a second AAA service at a second PoP of the data communications network; and*

*a database configurer configuring a database associated with the first AAA service from the central database by*

*transporting information from the central database over the data communications network to the database associated with the first AAA service and configuring a database associated with the second AAA service from the central database by transporting information from the central database over the data communications network to the database associated with the second AAA service*

*a protocol gateway receiving network access requests from users over the NAS, parsing the requests for domain identification and routing the requests for domains other than those associated with the first PoP to the proxy service,*

*said proxy service routing network access requests to AAA services in remote domains in accordance with said access information.*

*67. A hardware apparatus for managing network access to a data communications network, said method comprising:*

*means for maintaining a central database coupled to the data communications network;*

*means for maintaining at least a first authentication, authorization and accounting (AAA) service at a first point of presence (PoP) of the data communications network and a second AAA service at a second PoP of the data communications network;*

*means for configuring a database associated with the first AAA service from the central database by transporting information from the central database over the data communications network to the database associated with the first AAA service; and*

*means for configuring a database associated with the second AAA service from the central database by transporting information from the central database over the data communications network to the database associated with the second AAA service*

*means for receiving accounting information from a network access server (NAS) responsive to utilization of the data communications network by a user coupled to the data communications network through the NAS;*

*means for forwarding said accounting information to a local AAA service if the user's domain corresponds to that of the local PoP; and*

*means for forwarding said accounting information to a remote AAA service in the user's domain at an address and port as specified in the domain identification entry of the local AAA service's database if the user's domain does not correspond to that of the local PoP.*

*68. A hardware system for managing network access to a data communications network, said method comprising:*

*a central database coupled to the data communications network;*

*a plurality of first authentication, authorization and accounting (AAA) services disposed at a first point of presence (PoP) of the data communications network and a second AAA service disposed at a second PoP of the data communications network;*

*a first database configurer configuring one or more databases associated with the first AAA services from the central database by transporting information from the central database over the data communications network to the database(s) associated with the first AAA services; and*

*a second database configurer configuring a database associated with the second AAA service from the central database by transporting information from the central database over the data communications network to the database associated with the second AAA service*

*a protocol gateway receiving network access requests from users over the NAS, parsing the requests for domain identification and routing the requests for domains other than those associated with the first PoP to the proxy service,*

*said proxy service routing network access requests to AAA services in remote domains in accordance with said access information.*

*69. A hardware apparatus for managing network access to a data communications network, said method comprising:*

*means for maintaining a central database coupled to the data communications network;*

*means for maintaining a plurality of first authentication, authorization and accounting (AAA) service at a first point of presence (PoP) of the data communications network and a second AAA service at a second PoP of the data communications network; and*

*means for configuring one or more databases associated with the first AAA services from the central database by transporting information from the central database over the data communications network to the database(s) associated with the first AAA services; and*

*means for configuring a database associated with the second AAA service from the central database by transporting information from the central database over the data communications network to the database associated with the second AAA service*

*means for receiving accounting information from a network access server (NAS) responsive to utilization of the data communications network by a user coupled to the data communications network through the NAS;*

*means for forwarding said accounting information to a local AAA service if the user's domain corresponds to that of the local PoP; and*

*means for forwarding said accounting information to a remote AAA service in the user's domain at an address and port as specified in the domain identification entry of the local AAA service's database if the user's domain does not correspond to that of the local PoP.*

*70. A hardware system for managing network access to a data communications network, said method comprising:*

*a central database coupled to the data communications network;*

*a plurality of first authentication, authorization and accounting (AAA) services disposed at a first point of presence (PoP) of the data communications network and a second AAA service disposed at a second PoP of the data communications network; and*

*a database configurer configuring one or more databases associated with the first AAA services from the central database by transporting information from the central database over the data communications network to the database(s) associated with the first AAA services and configuring a database associated with the second AAA service from the central database by transporting information from the central database over the data communications network to the database associated with the second AAA service*

*a protocol gateway receiving network access requests from users over the NAS, parsing the requests for domain identification and routing the requests for domains other than those associated with the first PoP to the proxy service,*

*said proxy service routing network access requests to AAA services in remote domains in accordance with said access information.*

*71. A hardware apparatus for managing network access to a data communications network, said method comprising:*

*means for maintaining a central database coupled to the data communications network;*

*means for maintaining plurality of first authentication, authorization and accounting (AAA) service at a first point of presence (PoP) of the data communications network and a second AAA service at a second PoP of the data communications network; and*

*means for configuring one or more databases associated with the first AAA services from the central database by transporting information from the central database over the data communications network to database(s) associated with the first AAA services and for configuring a database associated with the second AAA service from the central database by transporting information from the central database over the data communications network to the database associated with the second AAA service*

*means for receiving accounting information from a network access server (NAS) responsive to utilization of the data communications network by a user coupled to the data communications network through the NAS;*

*means for forwarding said accounting information to a local AAA service if the user's domain corresponds to that of the local PoP; and*

*means for forwarding said accounting information to a remote AAA service in the user's domain at an address and port as specified in the domain identification entry of the local AAA service's database if the user's domain does not correspond to that of the local PoP.*

* * * * *